(No Model.)

J. BRANNING.
THRASHING MACHINE.

No. 461,864. Patented Oct. 27, 1891.

Witnesses.
A. H. Opsahl.
Frank D. Merchant.

Inventor.
Joseph Branning
By his Attorney.
Jas. F. Williamson

United States Patent Office.

JOSEPH BRANNING, OF OWATONNA, MINNESOTA.

THRASHING-MACHINE.

SPECIFICATION forming part of Letters Patent No. 461,864, dated October 27, 1891.

Application filed February 5, 1891. Serial No. 380,258. (No model.)

*To all whom it may concern:*

Be it known that I, JOSEPH BRANNING, a citizen of the United States, residing at Owatonna, in the county of Steele and State of Minnesota, have invented certain new and useful Improvements in Thrashing-Machines; and I do hereby declare the following to be a full, clear, and exact description of the invention, such as will enable others skilled in the art to which it appertains to make and use the same.

My invention relates to thrashing-machines, and has for its object to provide a straw-shaker which will effect a more perfect separation of the grain and chaff from the straw in less time and with less travel of the same. To this end I construct the shaker with angularly-projecting rack-line arms, the inclination being in the direction of the travel. The arms are preferably arranged in groups transverse of the shaker and spaced apart a short distance from each other. They are also preferably of unequal length and stand at different angles with reference to the body of the shaker. In other words, the arms are arranged in a double series, the short arms alternating with the long arms in the transverse line of the group. The shorter arms stand at a greater angle to the bed of the shaker. The bed of the shaker is preferably formed of longitudinal bars and transverse triangular slats. The shaker is hung within the frame of the machine with its head in a position to receive the unseparated straw, grain, and chaff as it comes from the cylinder and concave. An oscillating motion is given to the shaker in any suitable manner. The shaker may either be arranged in a horizontal or an inclined position, as may be preferred. The effect of this construction is to keep the straw in continual agitation by a series of upward and onward propulsions with intermittent breaks or falls. There is a small break in the passage of the straw from the short to the long arms and a large break between the successive groups of arms. The result is a very efficient separation with comparatively small travel, quickly passing the grain and chaff to the shoe, and delivering the straw over the end of the shaker in a loose condition.

The invention is illustrated in the accompanying drawings, wherein—

Figure 1:
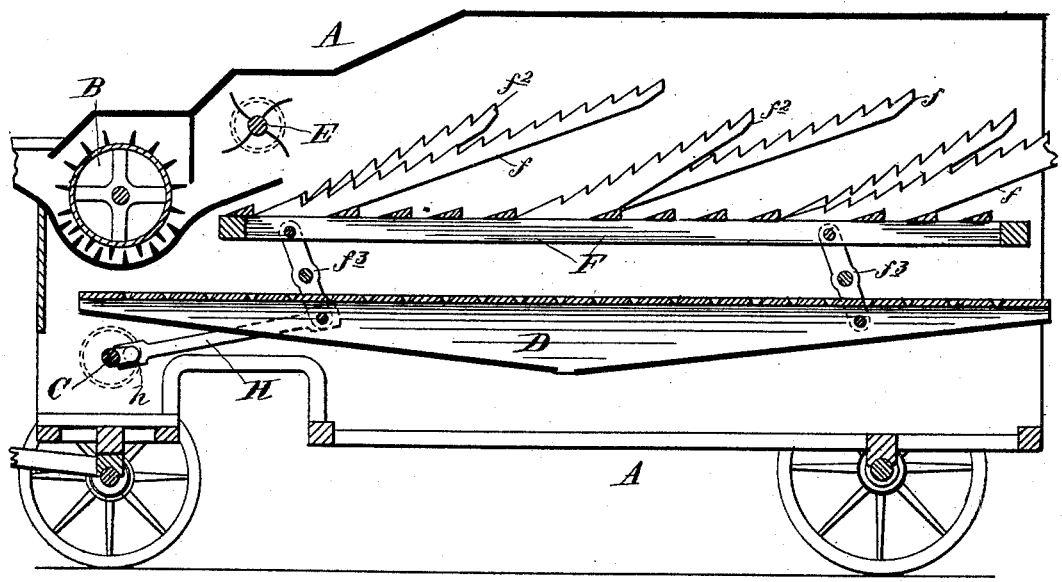
Figure 2:
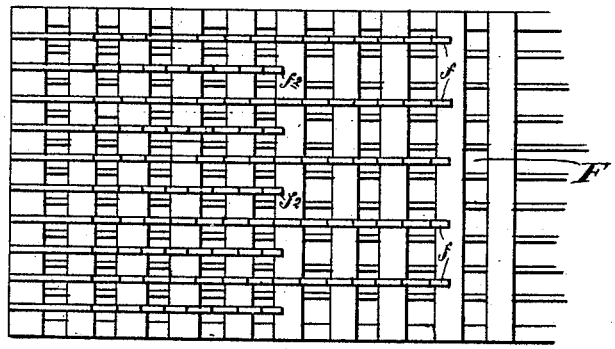

Figure 1 is a longitudinal vertical section of a thrashing-machine embodying my invention. Fig. 2 is a plan view of a part of the straw-shaker detached.

A B C D E represent the frame and certain parts of an ordinary thrashing-machine, of which B is the cylinder and concave, C a counter-shaft, D the shoe, and E a beater.

F represents the frame or bed of the straw-shaker; $f f^2$, the angularly-projecting rack-like arm, of which $f^2$ represents the shorter set.

$f^3$ are a pair of levers centrally pivoted to the frame, having their opposite ends connected, respectively, to the shaker and the shoe, and are operated to give an oscillating motion both to the shaker and the shoe by a connecting-rod H from an eccentric or crank $h$ on the counter-shaft C. The oscillating motion on the shaker, taken in connection with the angularly-projecting arms as arranged, give a rising-and-falling travel to the straw, the grain and chaff passing through the openings in the bottom of the shaker.

The general operation and the special advantages of the construction have already been stated.

What I claim, and desire to secure by Letters Patent of the United States, is as follows:

1. In a thrashing-machine, a straw-shaker having transversely-arranged groups of rack-like arms projecting therefrom at an angle, the said groups being spaced apart from each other and each group being composed of a double set or series of arms, one set of which is shorter than the other and stands at a greater angle to the body of the shaker, substantially as and for the purpose set forth.

2. In a thrashing-machine, the straw-shaker consisting of the oscillating skeleton frame provided with the transversely-arranged groups of angularly-projecting arms spaced apart and composed of two sets, one of which is shorter and stands at a greater angle than the other and is arranged so that the tips of its arms stand in advance (toward the cylinder) of the other, substantially as described.

In testimony whereof I affix my signature in presence of two witnesses.

JOSEPH BRANNING.

Witnesses:
E. W. RICHTER,
N. A. DYNER.